United States Patent [19]
Guergov

[11] Patent Number: 5,566,743
[45] Date of Patent: *Oct. 22, 1996

[54] METHOD OF INJECTING MOLTEN METAL INTO A MOLD CAVITY

[76] Inventor: Milko G. Guergov, 615 Washington #5, Monroe, Mich. 48161

[ * ] Notice: The term of this patent shall not extend beyond the expiration date of Pat. No. 5,441,680.

[21] Appl. No.: 370,602

[22] Filed: Jan. 10, 1995

Related U.S. Application Data

[63] Continuation-in-part of Ser. No. 236,471, May 2, 1994, Pat. No. 5,441,680.

[51] Int. Cl.⁶ .................................................. B22D 17/32
[52] U.S. Cl. ........................................ 164/457; 164/113
[58] Field of Search ................................. 164/457, 113, 164/120, 66.1, 133, 312, 155.3

[56] References Cited

FOREIGN PATENT DOCUMENTS 3505554  8/1986  Germany ............................... 164/312

*Primary Examiner*—Kuang Y. Lin
*Attorney, Agent, or Firm*—Brooks & Kushman P.C.

[57] ABSTRACT

A method of injecting molten plastic or aluminum material into a cavity defined within a mold to form a desired part shape is provided. The method includes: (a) providing pressurized gas in the mold cavity prior to injection of molten material into the cavity; (b) generating a melt pressure sufficient to inject the molten material into the cavity; and (c) providing a closed loop controller to maintain a controllable difference between the melt pressure and the pressure of gas in the cavity throughout a substantial portion of a period of time during which molten material is being injected into the cavity, the difference being sufficient to inject molten material into the cavity in a manner to improve the conditions under which the material solidifies. By preloading the system with static pressure, conditions are created which allow generation, measurement and real time control of pressure difference profiles during transition of the melt throughout the injection cycle.

5 Claims, 5 Drawing Sheets

PRESSURE DIFFERENCE PROFILE

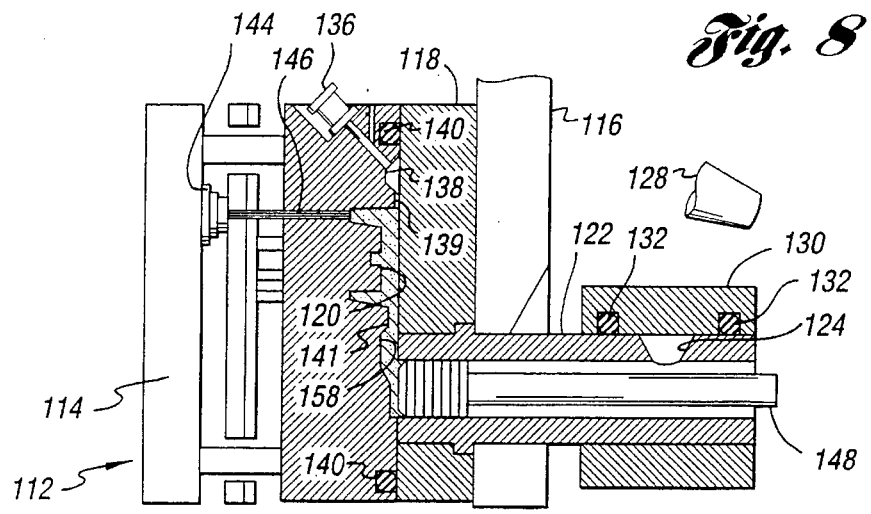
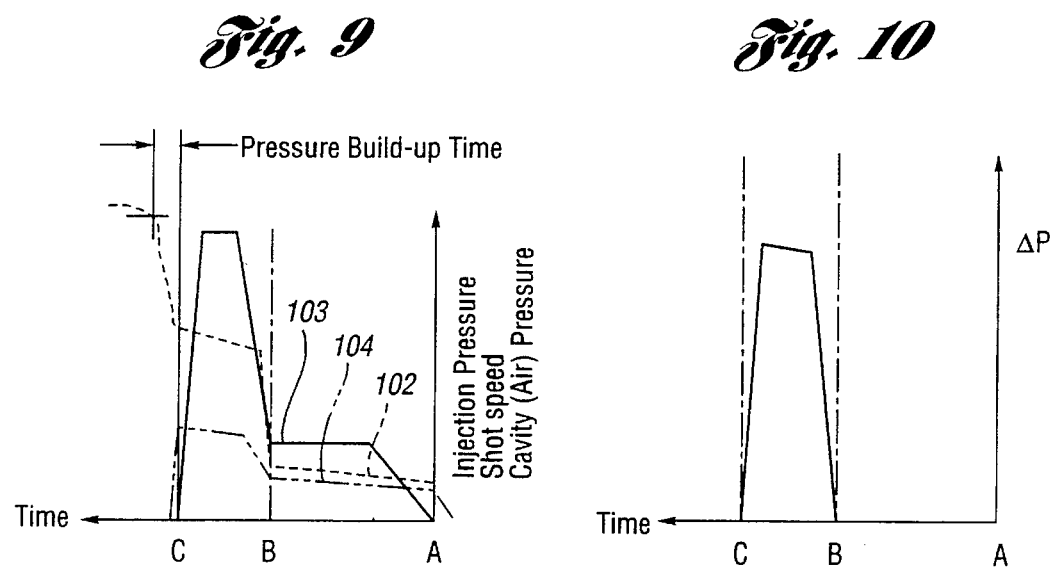
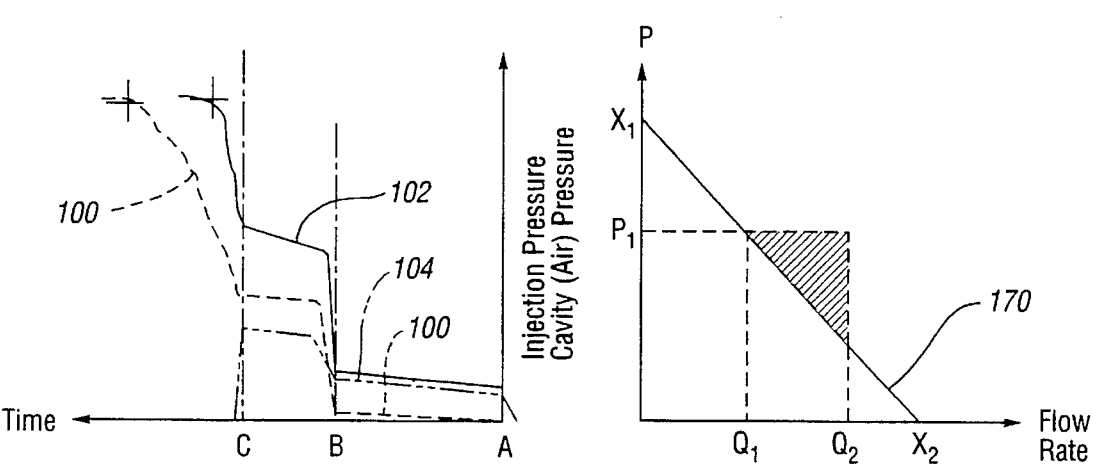
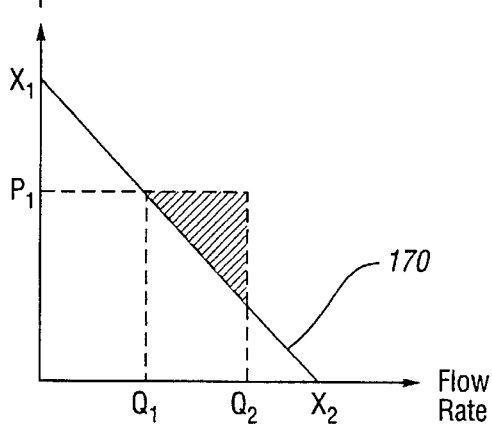

METHOD OF INJECTING MOLTEN METAL INTO A MOLD CAVITY

RELATED APPLICATION

This application is a continuation-in-part of U.S. patent application Ser. No. 08/236,471, filed May 2, 1994, now U.S. Pat. No. 5,441,680, herein incorporated by reference in its entirety.

TECHNICAL FIELD

The present invention relates to a method of injecting molten material into a cavity defined within a mold to form a desired part shape.

BACKGROUND ART

When molten plastic is processed by an injection molding machine, the plastic enters a mold cavity where it is cooled to form a desired part shape. As the cooling occurs, the plastic contracts within the cavity. As a result of this contraction, the part actually shrinks in size, and sink marks or low spots often occur on the surface of the part. Shrink and sink marks have caused major problems for injection molders since injection molding was first developed. Several methods have been developed in an attempt to eliminate these problems. Some examples include gas-assisted injection molding, structural foam molding, liquid gas assisted molding, etc. In addition, foaming agents have been used in the molding process for mixing with molten plastic in order to generate inert gases in the plastic. These gases provide internal pressure in the plastic which enables the plastic to more fully fill the cavity of the mold and packs the plastic against the cavity walls. This, in turn, helps reduce sink on the surface of the plastic parts. Also, gas counterpressure in the mold cavity has been used to improve surface smoothness of molded parts.

These prior art methods are all problematic due to the large number of variables in the molding process. Varying injection pressures and injection speeds, varying melt pressures and temperatures, varying cavity conditions, and uncontrolled venting of gases all contribute to an unstable molding environment. These various problems in the molding process create burning and scission of polymer chains and create internal stresses within the plastic which remain in the plastic as the plastic material cools in the cavity. These internal stresses cause shrink, sink, and warpage of the plastic part to be molded. In addition, these various molding problems lead to degradation of the plastic material as it is processed through an injection molding machine. In general, erratic variations in pressure, temperature, and injection speed create material breakdown and cause internal problems in the plastic which show up in the final product as molded.

Another disadvantage of prior art systems is that the plastic melt flow in these systems faces changes in pressure due to changes in cavity geometry as the molten plastic moves into the cavity of the mold. These pressure changes cause certain areas of the cavity to be filled more quickly then other areas, thus resulting in different cooling characteristics in different areas of the cavity. These cooling variations cause inconsistency in the direction of plastic solidification, which results in surface stresses, weld lines or sink.

It is desirable to develop a more balanced injection molding process in which the pressure of the molten plastic is more tightly and evenly controlled as the plastic moves through the injection molding machine. It is further desirable to develop an injection molding process in which pressures acting upon the plastic are balanced in order to eliminate the above referenced problems caused by variations in polymer chain conditions, in order to reduce internal stresses in the plastic. The ultimate goal of such an injection molding process would be to produce a final product which nearly perfectly matches the cavity surface of the mold and is fully relieved of internal stresses which lead to shrink, sink and warpage thereof and has greatly improved mechanical properties. In addition, part weight may be reduced, which will provide significant material savings to the manufacturers.

In aluminum casting, the primary problem experienced by manufacturers is the formation of hydrogen voids and gas porosity in the aluminum as the aluminum is cast. Many of these problems arise due to the fact that the mold cavity cannot be perfectly and completely evacuated of gases. The gas porosity and voids in the aluminum adversely effect metallic bonding and, accordingly, adversely effect mechanical properties of the final product. Furthermore, voids and gas porosity may create stresses within the part which can create warpage, decrease mechanical strength of the part, and cause dimensional variations in the part. Another problem faced by manufacturers is that formation of waves in the sleeve as the plunger moves forward may lead to entrapment of gases within the molten aluminum, which causes the same problems as described above. Waves may also be generated within the mold cavity as the material is injected into the mold. It would be desirable to develop a method of aluminum casting in which the solubility of hydrogen in the molten aluminum is increased and controlled in order to avoid the above referenced problems. It would further be desirable to develop a method of aluminum casting in which the formation of waves in the sleeve is decreased and the venting power of the liquid metal is increased.

DISCLOSURE OF THE INVENTION

This invention stems from the realization that, when injecting molten metal or molten plastic into a mold cavity, it is desirable to preload the system with pressure, which provides conditions under which pressure changes become measurable, and controllable pressure differences may be established between the pressure of gas in the mold cavity and the pressure of the molten material. By providing real-time closed loop control, the gas pressure and static melt pressure of the molten material may be sensed and mathematically monitored by the controller in order to provide optimal pressure conditions for injection and solidification of the material in the mold cavity. This closed loop pressure control on the basis of pressure differences created from pre-programmed transition of a preloaded melt into a mold cavity provides the capability to control the static pressure of the melt throughout the injection and solidification cycle and to provide optimal injection and solidification pressure conditions for the melt as the melt moves from the melt holder and solidifies within the mold cavity.

A method of injection molding is provided for use with an injection molding machine, comprising: (a) generating internal counterpressure within molten plastic as plastic pellets are plasticized in the injection molding machine; and (b) pressurizing air within a cavity of a mold in the injection molding machine to an air pressure level which is substantially equal to the internal counterpressure in order to counterbalance the internal counterpressure as the molten plastic is injected into the cavity, thus providing a substantially pressure-balanced molding environment for the plastic.

Further provided for use with an injection molding machine is a method of injection molding comprising: (a) generating pressurized gas and pressurized moisture within molten plastic as plastic pellets are plasticized in the injection molding machine, the pressurized gas and the pressurized moisture having a total pressure defining an internal counterpressure within the molten plastic; (b) pressurizing air within a cavity of a mold in the injection molding machine to an air pressure level which is substantially equal to the internal counterpressure in order to counterbalance the internal counterpressure as the molten plastic is injected into the cavity, thus providing a substantially pressure-balanced molding environment for the plastic; and (c) maintaining the air pressure level in the cavity substantially constant as the molten plastic is injected into the cavity.

Also provided for use with an injection molding machine is a method of injection molding, comprising: (a) calculating a maximum stress to be experienced by a shot of plastic to be molded in the injection molding machine, the stress being a result of a volumetric shrink occurring as the plastic is cooled in a cavity of a mold in the machine; (b) pressurizing a shot of plastic to a first melt pressure as the plastic is plasticized in a barrel of the injection molding machine, the first melt pressure being substantially equal to the calculated maximum stress; (c) pressurizing air within the cavity to an air pressure substantially equal to the first melt pressure; (d) commencing injection of the shot of plastic into the cavity in a laminar flow manner, wherein molten plastic flows into said vicinity concentrically with respect to a point at which plastic enters the cavity; (e) increasing the melt pressure on the shot of plastic to a second melt pressure, while maintaining the air pressure within the cavity substantially constant, and maintaining a substantially constant difference between the air pressure within the cavity and the second melt pressure during a substantial portion of a period of time which the shot of plastic is being injected into the cavity; (f) sensing the first and second melt pressures and generating feedback signals indicative thereof; (g) receiving said feedback signals, comparing said feedback signals to reference values, and producing signals for controlling said first and second melt pressures; and (h) repeating steps (b–g).

Also provided is a method of injection molding a plastic part for use with an injection molding machine, comprising: (a) forming a plurality of vents in a mold for use in the injection molding machine, the mold having a cavity formed therein, the vents being in fluid flow communication with the cavity of the mold to vent pressurized air from the cavity, while maintaining a substantially constant air pressure in the cavity, according to the following formula:

$$A = 0.24241 * W * \sqrt{T1} / (C * P1),$$

where A is a cross-sectional area of the vent, W is discharge of air through the vent in pounds per second, C is a coefficient of flow, P1 is the air pressure in the cavity in pounds per square inch, and T1 is a temperature in the cavity in degrees Fahrenheit;
(b) forming a channel in the mold in fluid flow communication with the vents; (c) sealing the mold to prevent leakage of pressurized air from the cavity; (d) providing first and second valves in selective fluid flow communication with the channel formed by the mold, the first valve being selectively movable between a closed position wherein pressurized air is prevented from moving therethrough and an open position wherein pressurized air is allowed to enter the channel therethrough, and the second valve being selectively movable between a closed position wherein pressurized air is prevented from moving therethrough and an open position wherein pressurized air is allowed to discharge therethrough from the channel; (e) calculating a maximum stress to be experienced by a shot of plastic to be molded in the injection molding machine, the stress being a result of volumetric shrink occurring as the plastic is cooled in the cavity of the mold; (f) pressurizing a shot of molten plastic in a barrel of the injection molding machine to a first melt pressure, the first melt pressure being substantially equal to the maximum stress; (g) moving the first valve to the open position; (h) moving the second valve to the closed position; (i) introducing pressurized air through the first valve into the cavity until the air pressure in the cavity is equal to the first melt pressure; (j) moving the first valve to the closed position; (k) injecting the shot of plastic into the cavity; (l) increasing the melt pressure of the shot of plastic to a second melt pressure, thus creating a pressure difference between the second melt pressure and the gas pressure in the cavity; (m) maintaining the pressure difference between the second melt pressure and the air pressure in the cavity substantially constant for a substantial portion of a period of time in which plastic is being injected into the cavity; (n) moving the second vent to the open position to release pressurized air therethrough; and (o) repeating steps (f)–(n).

Further provided is a mold for use in an injection molding machine, comprising a front half and a back half of the mold. The front half includes an aperture formed therethrough for receiving molten plastic from the injection molding machine. The front half and back half cooperate to form a cavity therebetween, and the cavity is in fluid flow communication with the aperture to receive molten plastic therefrom. A plurality of vents are formed in one of the back half and front half, the vents having first and second ends thereof. The first end of each of the plurality of vents is in fluid flow communication with the cavity. The vents are configured according to the following formula to maintain a substantially constant air pressure in the cavity as the cavity is being filled with plastic: $A=0.24241 , W*\sqrt{T1}/(C*P1)$, where A is a cross-sectional area of a vent, W is discharge of pressurized air through the vent in pounds per second, C is a coefficient of flow, P1 is the air pressure in the cavity in pounds per square inch, and T1 is a temperature in the cavity in degrees Fahrenheit. A channel is formed in one of the back half and the front half, the channel being in fluid flow communication with the second end of each of the plurality of vents for transferring pressurized air into and out of the cavity through the vents. A pair of valves are provided in selective fluid flow communication with the channel. One of the pair of valves is adapted to selectively receive pressurized air from a pneumatic line to provide pressurized air to the channel, and the other of the pair of valves is adapted to selectively allow discharge of pressurized air from the channel. A seal is circumscribed around the cavity and positioned between the front half and back half to prevent discharge of pressurized air from the cavity between the front half and the back half of the mold as the cavity is being filled with molten plastic.

Also provided is a method of reducing internal stresses in plastic parts formed in a mold cavity from molten plastic injected into the mold cavity by an injection molding apparatus, comprising the steps of: pressuring the cavity to a predetermined air pressure; operating the injection molding apparatus to develop molten plastic at a first melt pressure equal to the predetermined air pressure; communicating the molten plastic with the mold cavity when the predetermined air pressure and first melt pressure become equal; and subsequently increasing the melt pressure to a second melt pressure, and maintaining a substantially constant difference between the air pressure within the mold cavity and the second melt pressure during a substantial portion of a predetermined period of time in which the molten plastic is being injected into the mold cavity, whereby to optimize pressure conditions acting upon the molten plastic in a manner to reduce internal stresses in the plastic parts being formed.

Further provided is a method of injection molding for use with an injection molding machine including a mold with a cavity formed therein for receiving molten plastic and a hydraulic unit for creating an injection pressure to fill the mold cavity with molten plastic at a predetermined melt pressure, comprising: supplying air to the cavity at a predetermined air pressure; sensing the melt pressure during injection; sensing the air pressure in the cavity during injection; and providing a closed loop controller to monitor the sensed melt pressure and sensed air pressure and to produce signals to be sent to the hydraulic unit for maintaining the melt pressure at desired levels.

Also provided is a method of injection molding for use with an injection molding machine including a mold therein, the method comprising: determining a maximum stress to be experienced by plastic as the plastic is processed in the mold; generating counterpressure within the plastic prior to injection of the plastic into the mold, said counterpressure being substantially equal to said determined maximum stress; and maintaining said counterpressure within the plastic at least equal to the determined maximum stress as the plastic is injected into the mold.

Further provided is a method of injection molding for use with an injection molding machine including a mold with a cavity formed therein for receiving pressurized air and means for creating an injection pressure sufficient to fill the mold cavity with molten plastic, the molten plastic having a total pressure defining a melt pressure, the method comprising: monitoring the pressure of air in the mold cavity; monitoring the injection pressure while the mold cavity is being filled; and maintaining a substantially constant difference between the pressure of air in the cavity and the injection pressure while molten plastic is being injected into the cavity to optimize molding conditions.

In addition, a method of injecting molten metal into a mold cavity defined within a mold in a metal casting apparatus is provided, comprising: supplying pressurized gas to the mold cavity and melt holder to pressurize the gas in the cavity and molten metal in the melt holder to provide a preloaded static system which creates conditions under which any pressure differences from following transitions are measurable and are used for closed loop control during injection; generating a melt pressure in the molten metal sufficient to inject the molten metal into the cavity after the cavity is pressurized; measuring the melt pressure and the pressure of gas in the cavity as the melt moves from the melt holder into the mold cavity; and providing a closed loop controller to maintain a predetermined controllable pressure difference between the melt pressure and the pressure of gas in the cavity throughout a substantial portion of a period of time during which molten metal is being injected into the cavity to fill the cavity.

Also provided is a method of metal casting without the formation of significant porosity and voids for use with a metal casting apparatus including a sealable sleeve and a mold having a mold cavity formed therein, the sleeve having a plunger for pushing molten metal from the sleeve into the mold cavity in a potentially wave-forming manner, the plunger being movable from a first position in which the plunger is retracted, a second position at which injection of the molten metal into the mold cavity begins and a third position at which the mold cavity is substantially full of molten metal, the method comprising: supplying pressurized gas in the sleeve adjacent the molten metal to sufficiently increase the level of solubility of hydrogen in the molten metal as the plunger is moved from the first position toward the second position, whereby to prevent formation of significant gas porosity and voids in the casting and decrease wave formation; and supplying pressuring gas in the mold cavity to sufficiently increase the level of solubility of hydrogen in the molten metal in the mold cavity as the plunger is moved from the second position toward the third position, whereby to prevent formation of significant porosity and voids in the casting.

Further provided is a method for metal casting without the formation of significant gas porosity and voids for use with a metal casting apparatus including a sealable sleeve and a mold having a mold cavity formed therein, the sleeve having a plunger for pushing molten metal from the sleeve into the mold cavity, the plunger being movable from a first position at which the plunger is retracted, to a second position at which the injection of the molten metal into the mold cavity begins, and to a third position at which the mold cavity is substantially full of molten metal, the method comprising: providing pressurized gas in the mold cavity and in the sleeve to increase the level of solubility of hydrogen in the molten metal as the molten metal travels from the sleeve into the mold cavity, whereby to prevent the formation of significant gas porosity and voids.

Another aspect of the present invention provides a method of aluminum casting for use with an aluminum casting apparatus including a sleeve and a mold having a mold cavity formed therein, the sleeve having a plunger for pushing molten aluminum from the sleeve into the mold cavity, the molten aluminum having a static pressure and a dynamic pressure during movement into the cavity, the method comprising: providing pressurized gas in the mold cavity sufficient to generate and maintain a static pressure in the molten aluminum as the molten aluminum moves from the sleeve into the mold cavity, the static pressure being sufficient to maintain an increased level of solubility of hydrogen in the molten aluminum as the molten aluminum travels from the sleeve into the mold cavity.

Further provided is a method of aluminum casting for use with an aluminum casting apparatus including a sleeve and a mold having a mold cavity formed therein, the sleeve having a plunger for pushing molten aluminum from the sleeve into the mold cavity in a manner potentially forming volumetric deficits and negative pressures in the molten aluminum as the aluminum solidifies in the cavity, the molten aluminum having a static pressure and a dynamic pressure during movement into the cavity, the method comprising: providing pressurized gas in the mold cavity sufficient to generate and maintain a static pressure in the molten aluminum as the molten aluminum moves from the sleeve into the mold cavity, said static pressure being sufficient to maintain an increased level of solubility of hydrogen in the molten aluminum and to reduce volumetric deficits and negative pressures formed in the molten aluminum as the molten aluminum travels from the sleeve and solidifies in the mold cavity.

Also provided is a method of metal casting for use with a metal casting apparatus including a sleeve and a mold having a mold cavity formed therein, the sleeve having a sealable feed throat and a plunger for pushing molten metal from the sleeve into the mold cavity in a potentially wave forming manner, the plunger being movable from a first position at which the plunger is retracted, to a second position at which injection of the molten metal into the mold cavity begins, and to a third position at which the mold cavity is substantially full of molten metal, the method comprising: providing pressurized gas in the sleeve adjacent the molten metal sufficient to decrease the amplitude of any waves formed in the molten metal as the plunger moves from the first position toward the second position, whereby to discourage entrapment of gases in the molten metal.

Further provided is a method of improving venting power of molten metal as it is injected from a melt holder into a mold cavity formed within a mold in a metal casting apparatus. The cavity includes small indentations formed therein, such as ribs or bosses, which exist lateral to the flow direction of the molten metal. The method comprises: providing pressurized gas to the mold cavity; and maintaining a pressure difference between the dynamic melt pressure and the pressure of gas in the cavity to create a static pressure in the molten metal, whereby to improve the venting power of the molten metal to allow the molten metal to vent, fill and pack out any said indentations as the molten metal moves through the cavity.

Also provided is a method of injecting molten metal from a melt holder into a mold cavity defined within a mold in a metal casting apparatus, comprising: supplying pressurized gas to the mold cavity and to the melt holder to pressurize gas in the cavity and molten metal in the melt holder sufficiently to provide a preloaded static system which creates conditions under which any pressure differences from following transitions are measurable and are used for closed loop control during injection; generating a melt pressure in the molten metal sufficient to inject the molten metal into the cavity after the gas in the cavity is pressurized; measuring the melt pressure and the pressure of gas in the cavity as the melt moves from the melt holder into the mold cavity; and providing closed loop pressure control based upon pressure differences created from preprogrammed transition of the preloaded molten metal into the cavity, whereby to create and control a static pressure of the molten metal throughout injection and solidification of the metal within the cavity.

Further provided is a method of improving feeding of solidifying crystal structures of molten metal as the molten metal is cast in a metal casting apparatus, the apparatus including a sleeve and a mold having a mold cavity formed therein, the sleeve having a plunger for pushing molten metal from the sleeve into the mold cavity, the plunger being movable between a first position at which the plunger is retracted, a second position at which injection of the molten metal in the mold cavity begins, and a third position at which the mold cavity is substantially full of molten metal, the method comprising: supplying pressurized gas in the sleeve adjacent the molten metal as the plunger is moved from the first position toward the second position; and supplying pressurized gas in the mold cavity sufficiently to improve feeding of the molten aluminum into the solidifying crystal structures in order to reduce formation of voids and to improve metallic bonding during solidification.

Also provided is a method of eliminating the effects of mold resistance resulting from varying gate configurations and mold cavity configurations in a metal casting process for use with a metal casting apparatus including a sealable sleeve and a mold having a mold cavity formed therein, the sleeve having a plunger for injecting molten metal from the sleeve into the mold cavity, the method comprising providing pressurized gas in the sleeve prior to injection of the molten metal from the sleeve into the cavity and providing pressurized gas in the cavity as the molten metal is injected into the cavity, said pressurized gas in the cavity having a gas pressure at least as great as any pressure drops caused by said varying gate configurations and mold cavity configurations, whereby to eliminate mold resistance effects of varying cavity configurations and gate configurations.

These and other features, objects and advantages of the present invention will become apparent upon reading the following description therefor together with reference to the accompanying drawings.

BRIEF DESCRIPTION OF THE DRAWINGS

FIG. 8 is a vertical cross-section of an aluminum casting apparatus including a mold, with the molten aluminum completely filling the mold cavity in accordance with the present invention;

FIG. 9 is a graphical illustration of the melt pressure, shot speed and cavity air pressure versus time in accordance with the present invention;

FIG. 10 is a graphical illustration of the pressure difference between the air pressure in the cavity and the melt pressure versus time;

FIG. 11 is a graphical illustration of the prior art melt pressure in comparison to the melt pressure and cavity pressure versus time in accordance with the present invention; and FIG. 12 is a graphical illustration of an injection power curve in accordance with the present invention.

BEST MODES FOR CARRYING OUT THE INVENTION

Figure 1:
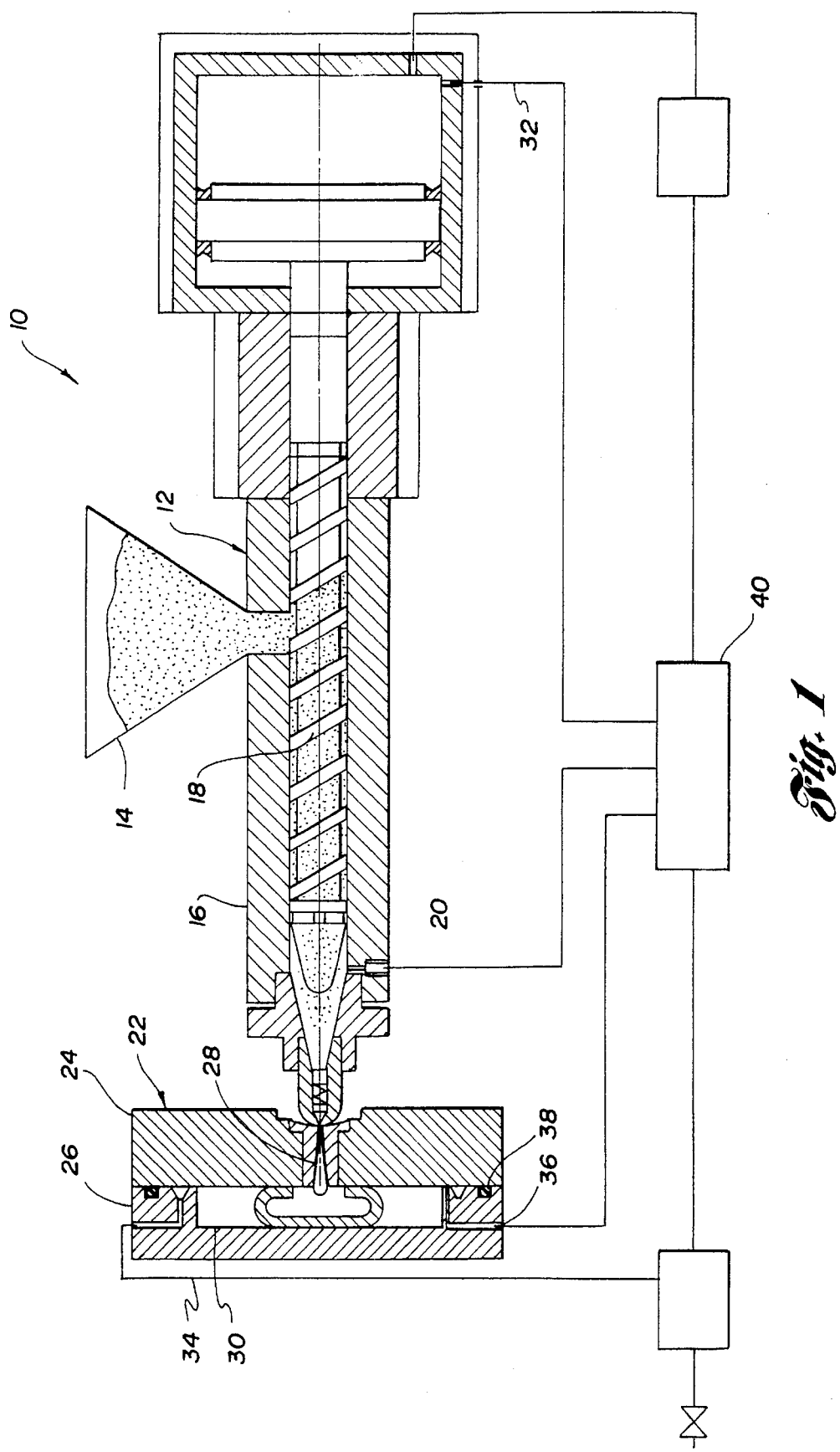
FIG. 1 is a schematic of an injection unit for an injection molding machine having a mold and pressure control system connected thereto according to the present invention.

Referring to FIG. 1, an injection molding machine 10 is shown, including an injection unit 12, for use with the present method. Plastic resin moves from the hopper 14 into the barrel 16 of the injection molding machine. Heat from the barrel 16 and rotational movement of the screw 18 cause the plastic resin to melt and form a shot of plastic to be molded by the machine. The shot of plastic is pressurized by the machine. The melt pressure of the shot of plastic is measured and regulated through a melt pressure transducer 20. A positive shutoff valve is provided at the tip of the barrel 16 in order to prevent drool of plastic through the nozzle and to allow pressurization of molten plastic in the barrel 16.

A mold 22 is inserted into the injection molding machine 10. The mold 22 includes a front half 24 and back half 26. The front half 24 has an aperture 28 formed therethrough for receiving the shot of molten plastic from the injection molding machine. The front half 24 and back half 26 of the mold 22 cooperate to form a cavity 30 therebetween. The cavity 30 is in fluid flow communication with the aperture 28 for receiving the shot of molten plastic therethrough. The shot of molten plastic is packed into the cavity 30 and held therein in order to cool and form a plastic part matching the shape of the cavity.

Transducers are provided for sensing pressures throughout the molding process. Injection pressure for the injection unit 12 is monitored by the injection pressure transducer 32. Air pressure is provided to the cavity 30 of the mold 22 through the pneumatic line 34. Air pressure in the cavity 30 is monitored by the air pressure transducer 36. The air pressure transducer is located in a vent so that a true pressure reading may be taken from the cavity. The vent with the pressure transducer will be discommunicated from the channel 44. A rubber seal 38 is provided between the front half and the back half 26 of the mold 22 to prevent escape of pressurized air from the cavity 30 of the mold. Often, when molten plastic is injected into a mold under high pressure, the front half 24 and back half 26 of a mold will separate slightly, thus allowing escape of pressurized air therefrom. The rubber seal 38 is designed to prevent this escape of pressurized air from the cavity.

A closed loop controller 40 is provided with the injection molding machine 10. The closed loop controller 40 receives pressure signals from the pressure transducers 20,32,36, compares these pressure signals to previously determined reference values, and sends signals to the injection molding machine to adjust the pressures accordingly.

Figure 2:
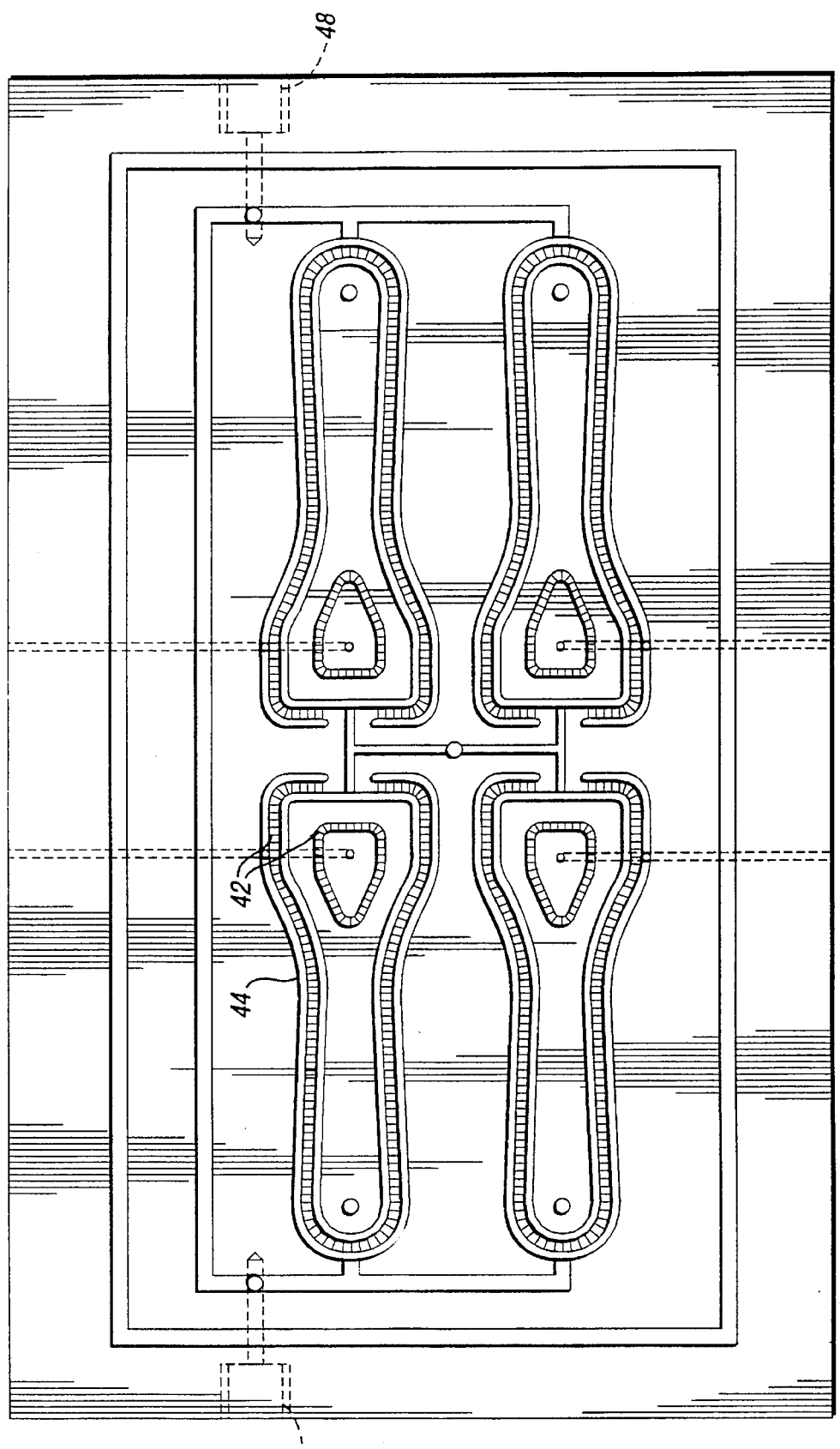
FIG. 2 is plan view of a back half of a mold according to the present invention.

Referring to FIG. 2, a plurality of vents 42 are shown in fluid flow communication with the cavity 30. The purpose of these vents is to allow discharge of pressurized air and gases as molten plastic is injected into the cavity 30. A channel 44 is provided around the cavity 30 in fluid flow communication with the vents 42. The pressurized air and gases move through the vents into the channel. A first valve 46 is provided in selective fluid flow communication with the channel 44 for providing pressurized air from the pneumatic line 34 to the channel 44. Similarly, a second valve 48 is provided in selective fluid flow communication with the channel 44 for release of pressurized air therefrom. The purpose of this sealed and valved venting system is to provide venting orifice controls immediately in front of the melt flow, rather than outside of the mold. In this manner, cavity air pressure may be provided to resist the melt pressure as molten plastic is injected into the cavity.

A method according to the present invention for use with the above described apparatus is based upon the fact that each volumetric unit of molten plastic injected into the cavity will shrink due to adjustment of surface tension forces during cooling, and substantial stresses will be built up in the solid part. These conditions may be alleviated by creation of entrained gases within the molten plastic. These entrained gases will act as a lubricator by substantially changing the fluidity of the melt and decreasing the amount of injection pressure required to inject the molten plastic into the cavity. The entrained gases cause the molten plastic to be much more pliable and easier to manipulate. Also, the predicted volumetric difference between the volume of the mold cavity and the volume of a solid part molded by the cavity can be used as a basis for premixing the molten plastic in the barrel at sufficient pressure to resist the volumetric shrink and eliminate the internal stresses.

By generating a certain desired amount of entrained gases and moisture within the molten plastic, a level of partial pressure of the entrained gases and moisture may be established at which movement of the pressurized gas and moisture will be stopped. Also, the decomposition of the gases may be stopped and the gases may be forced to maintain a static position by means of balanced surface tension forces. In addition, negative pressures in the solidifying plastic are eliminated.

The venting system shown in FIG. 2 creates the possibility of maintaining a constant gas pressure resistance in the cavity, which eliminates uneven flow distribution of the molten plastic in the cavity. The molten plastic will be distributed substantially concentrically in the cavity space with respect to the aperture 28. This provides the unique possibility for the melt to travel in the cavity and solidify in the cavity under the same pressure characteristics at all sections of the part. This also eliminates the possibility of gases entrained within the molten plastic traveling to the surface of the shot of the plastic. The feeding rate of the molten plastic into the cavity is maintained constant in all areas of the cavity. This constant feeding rate along with the internal pressures created in the entrained gases and moisture provide the advantage of increasing the cooling rates because of earlier pressurized contact of the molten plastic with the cavity walls. This pressurized contact allows the molten plastic to cool more quickly as a result of heat dissipation through the walls of the cavity. Increased cooling rates result in substantial cycle time reduction which leads to considerable savings for the manufacturer.

Controlling the air pressure in the cavity of the mold provides the capability of establishing a balanced molding environment for the molten plastic. Processing the molten plastic under these conditions prevents degradation and scission of the polymers which are normally chemically attacked by decomposition products in the presence of moisture.

As a result of the pressure balance between the air pressure in the cavity and the melt pressure, the development of surface tension in the plastic is avoided. Effectively, this balanced pressure system creates a directional solidification of the plastic. In other words, the molten plastic cools in a constant, straight line from the surface of the molten plastic to the center of the plastic. This directional solidification eliminates surfaces stresses, which lead to shrink, sink and warpage of the part. The end result of this process is the production of a part which is free of shrink and sink, fully stress relieved, and a nearly exact copy of the cavity surface. Furthermore, this process produces parts having strong mechanical properties and configuration stability in addition to enhanced structural integrity.

In accordance with the most preferred embodiment of the present invention, a method of injection molding for use with an injection molding machine is provided. The first step is to calculate a maximum stress to be experienced by a shot of plastic to be molded in the injection molding machine 10 in accordance with the particular mold cavity configuration, the stress being a result of volumetric shrink occurring as the plastic is cooled in the cavity 30 of the mold 22. Assuming that the part to be molded is an elongate rod having a rectangular cross-section, the following formulas apply. The maximum uniform load experienced by the part as a result of shrink is calculated as follows:

$$q = \frac{yEh^3 \left[ 1 + 1.05 \left( \frac{a}{b} \right)^5 \right]}{.0284 a^4}$$

where q is a uniform load per unit area, a is width of the cavity, b is thickness of the cavity, h is height of the cavity, E is apparent modulus of elasticity of the plastic, and y is a shrinkage factor of the plastic.

The uniform load calculation equations will vary, depending upon the configuration of the part and the plastic to be processed. Of course, these formulas may be programmed into the machine controller so that the operator is only required to enter the properties of the plastic to process the machine.

A maximum mechanical stress to be experienced by the shot of plastic is then calculated in accordance with the maximum uniform load:

$$S \text{ (mechanical)} = \frac{qa^2}{2h^2 \left[ 1 + .0623 \left( \frac{a}{b} \right)^6 \right]}$$

where S (mechanical) is a maximum mechanical stress to be experienced by the part, a is width of the cavity, b is thickness of the cavity, h is height of the cavity, and q is the uniform load per unit area.

Again, the maximum mechanical stress calculation equations will vary depending upon part configuration.

A maximum thermal stress to be experienced by the shot of plastic is then calculated in accordance with the following formula:

$$S \text{ (thermal)} = dT \ast L \ast E$$

where S (thermal) is a maximum thermal stress to be experienced by the part, dT is a change in the temperature of the plastic between room temperature and the temperature at which the plastic is in a plastic range of deformation, L is a thermal coefficient, and E is a modulus of elasticity of the plastic.

Finally, the maximum stress to be experienced by a shot of plastic is determined to be the greater value of S (mechanical) and S (thermal).

The next step in the process is to pressurize a shot of plastic to a first melt pressure as the plastic is plasticized in the barrel 16 of the injection molding machine, the first melt pressure being substantially equal to the calculated maximum stress.

The cavity 30 is then pressurized to an air pressure which is substantially equal to the first melt pressure. Injection of the shot of plastic into the cavity is commenced after the air pressure has reached the first melt pressure. As the molten plastic enters the cavity 30, the air pressure in the cavity acts against the melt pressure in order to provide a pressure balance for the molten plastic.

Figure 4:
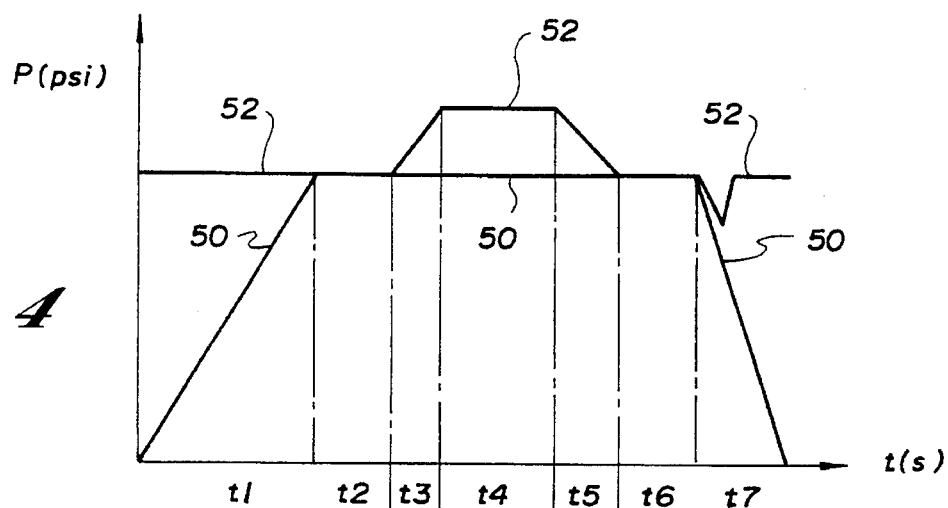
FIG. 4 is a graphical illustration of a melt pressure and air pressure cycle in an injection molding machine according to the present invention.
Figure 5:
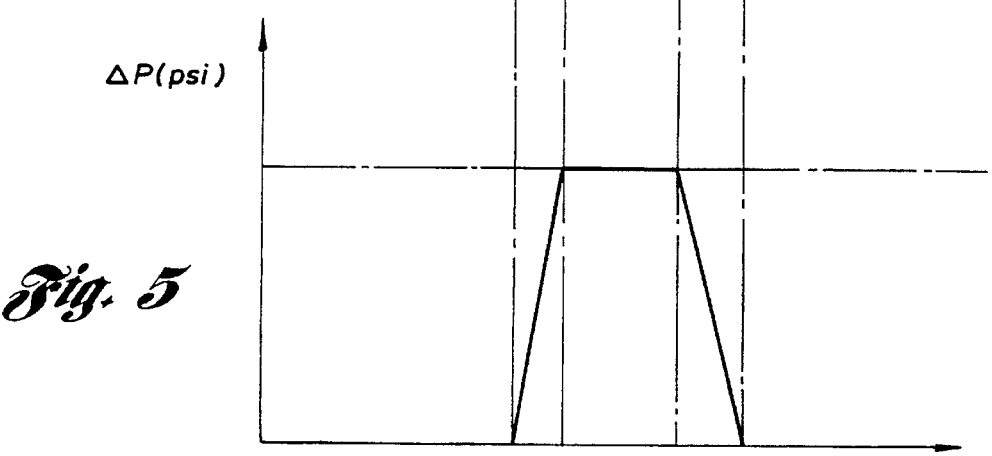
FIG. 5 is a graphical illustration of a pressure difference profile between a melt pressure and an air pressure in an injection molding machine according to the present invention.

As the shot of plastic is injected into the cavity, the melt pressure on the shot of plastic is increased from the first melt pressure to a second melt pressure, while maintaining the air pressure within the cavity substantially constant. In addition, a substantially constant difference between the air pressure within the cavity and the second melt pressure is maintained during a substantial portion of a period of time in which the shot of plastic is being injected into the cavity. Reference to FIGS. 4 and 5 further illustrates this method. Referring to FIG. 4, the air pressure 50 in the cavity and the melt pressure 52 of the molten plastic are illustrated as a function of time. During the period of time t1, the air pressure 50 is built up to equal the melt pressure 52. The time period t2 is a relaxation time to allow the air pressure to equalize with the melt pressure. During t3, injection of the molten plastic into the cavity begins and the melt pressure increases from the first melt pressure to the second melt pressure. During t4, the pressure difference between the second melt pressure and the air pressure 50 is maintained substantially constant, as shown in FIG. 5. In the t5 period, the melt pressure 52 is decreased from the second melt pressure to the first melt pressure, and the two pressures are equalized during the t6 period. At t7, the air pressure 50 in the cavity is released and the next shot of plastic is prepared.

The present invention contemplates that no specific pressure profiles are required for the air pressure or the melt pressure. The key to this invention is the preloading of the system and the maintenance of a pressure difference between the air pressure and the melt pressure for a substantial portion of injection. The pressure difference is generated in accordance with the specific usage requirements in order to control the amount of dynamic pressure which is converted to static pressure, and the pressure difference may vary accordingly. Therefore, the air pressure and melt pressure may be decreased or increased in accordance with any pressure profile, so long as the pressure difference between the melt pressure and air pressure is maintained substantially constant. Furthermore, it is not a requirement that the air pressure be originally set equal to the maximum stress calculation. Again, the key is the development and maintenance of a pressure difference between the air pressure and melt pressure as the molten plastic is injected into the cavity. Varying air pressure and melt pressure profiles are contemplated under the present invention.

A closed loop controller 40 is provided to monitor the first and second melt pressures and the air pressure in the cavity, and to produce signals for maintaining the first and second melt pressures.

Finally, the method is repeated by returning to the step of pressurizing the next shot of plastic to a first melt pressure in the barrel 16. Accordingly, injection molded products are produced repeatedly.

It is further preferable to inject the shot of plastic into the cavity from the barrel 16 at relatively low rates. Manufacturers commonly provide suggested injection speeds within high and low speed values. It is desirable to inject a molten plastic into the cavity in the lower 10% of rates suggested by manufacturers in order to decrease turbulence and material degradation of the plastic. Similarly, manufacturers provide high and low injection pressure values. It is desirable to inject the plastic into the cavity at an injection pressure in the lower 10% of ranges suggested by manufacturers. Filling the cavity at low injection speeds and low injection pressures avoids destruction and degradation of the polymer chains.

A second embodiment of the present invention provides a method of injection molding for use with an injection molding machine, comprising: (a) forming a plurality of vents 42 in a mold for use in the injection molding machine, the mold having a cavity formed therein, the vents being in fluid flow communication with the cavity 30 of the mold to vent pressurized air from the cavity, while maintaining a substantially constant air pressure in the cavity, according to the following formula: $A=0.24241W*\sqrt{T1}/(C*P1)$, where A is a cross-sectional area of the vent, W is discharge of air through the vent in pounds per second, c is a coefficient of flow, P1 is the air pressure in the cavity in pounds per square inch, and T1 is a temperature in the cavity in degrees fahrenheit; (b) forming a channel 44 in by the mold in fluid flow communication with the vents 42; (c) sealing the mold to prevent leakage of pressurized air from the cavity and from the channel; (d) providing first and second valves 46,48 in selective fluid flow communication with the channel 44 formed by the mold, the first valve 46 being selectively movable between a closed position wherein pressurized air is prevented from moving therethrough and an open position wherein pressurized air is allowed to enter the channel 44 therethrough, and the second valve 48 being selectively movable between a closed position wherein pressurized air is prevented from moving therethrough and an open position wherein pressurized air is allowed to discharge therethrough from the channel 44; (e) calculating a maximum stress to be experienced by a shot of plastic to be molded in the injection molding machine, the stress being the result of volumetric shrink occurring as the plastic is cooled in the cavity of the mold; (f) pressurizing a shot of molten plastic in the barrel 16 of the injection molding machine to a first melt pressure, the first melt pressure being substantially equal to the maximum stress; (g) moving the first valve 46 to the open position; (h) moving the second valve 48 to the closed position; (i) introducing pressurized air through the first valve 46 into the cavity 30 until the air pressure in the cavity is substantially equal to the first melt pressure; (j) moving the first valve to the closed position; (k) commencing injection of the shot of plastic into the cavity 30; (l) increasing the melt pressure of the shot of plastic to a second melt pressure; thus creating a pressure difference between the second melt pressure and the gas pressure in the cavity; (m) maintaining the pressure difference between the second melt pressure and the air pressure in the cavity substantially constant for a substantial portion of the period of time in which plastic is being injected into the cavity; (n) moving the second valve 48 to the open position to release pressurized air from the channel; and (o) repeating steps (f)–(n).

It is understood that these steps need not necessarily be performed sequentially. Variations in the order of the steps provided in this method are contemplated as part of the present invention.

Reference to FIG. 4 provides a basis for description of the valves 46,48 and the venting system as provided in the second embodiment of the present invention described above. Beginning with step (h) of the second embodiment of the present invention, the first valve 46 is moved to the open position and the second valve 48 is moved to the closed position prior to the time period t1 of FIG. 4. During the t1 period, pressurized air is introduced through the first valve 46 into the cavity 30 until the air pressure in the cavity is substantially equal to the first melt pressure. The first valve 46 is then moved to the closed position. The first and second valves remain closed as the molten plastic is injected into the cavity. A pressure difference is then established and maintained between the air pressure in the cavity and a second melt pressure for a substantial period of time (T4). The melt pressure and air pressure are then equalized (T5,T6), and then the second valve 48 is moved to the open position in order to release pressurized air from the channel (T7).

The purpose of this closed venting system is to provide a molding environment for the molten plastic wherein pressures acting upon each individual gas molecule are balanced so that very little movement of the gas occurs within the plastic between adjacent molecules. This balance prevents gas molecules from moving toward the surface of the plastic or incorporating with other gas molecules to form larger voids or cells.

One skilled in the art will appreciate the utility of adding chemical blowing agents to the molten plastic. Chemical blowing agents are useful in controlling the amount of gas decomposed and entrained in the melt during plastification. These blowing agents generate inert gases when heated. The gases create voids in the material which can lead to substantial weight reduction of the part, and the pressure of these voids may be used to help fill the cavity and to pack out the plastic against the walls of the cavity.

Figure 3:
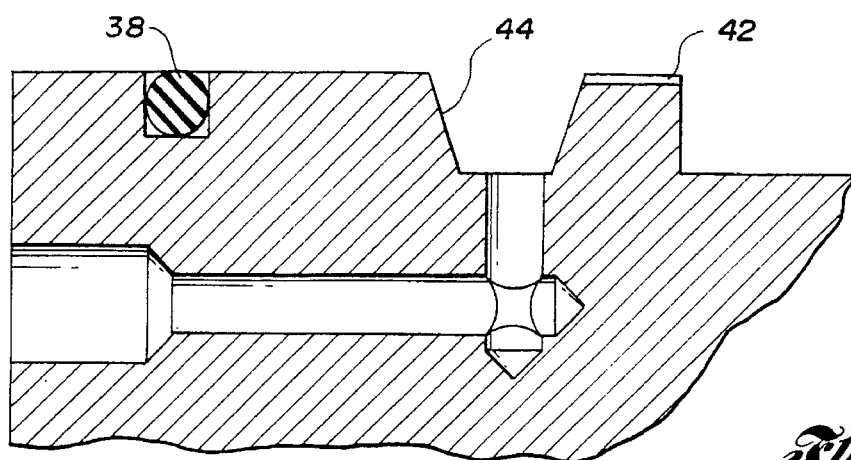
FIG. 3 is a vertical cross-sectional view taken through FIG. 2 of an injection mold according to the present invention.

Referring to FIGS. 1–3, a third embodiment of the present invention provides a mold 22 for use in an injection molding machine 10. The mold has a front half 24 and a back half 26, the front half 24 having an aperture 28 formed therethrough for receiving molten plastic from the injection molding machine. The front half 24 and the back half 26 cooperate to form a cavity 30 therebetween. The cavity 30 is in fluid flow communication with the aperture 28 to receive the molten plastic therefrom. A plurality of vents 42 are formed in the back half of the mold, as shown in FIG. 2. The vents 42 have first and second ends thereof. The first end of each of the plurality of vents is in fluid flow communication with the cavity 30. The vents are configured according to the following formula to maintain a substantially constant air pressure in the cavity 30 as the cavity is being filled with plastic: $A=0.24241*W*\sqrt{T1}/(C*P1)$, where A is a cross-sectional area of a vent, W is discharge of pressurized air through the vent in pounds per second, C is a coefficient of flow, P1 is the air pressure in the cavity in pounds per square inch, and T1 is a temperature in the cavity in degrees Fahrenheit.

A channel 44 is formed in the back half of the mold. The channel 44 is in fluid flow communication with the second end of each of the plurality of vents 42. The cavity 30, vents 42 and channel 44 are shown in FIG. 3. A pair of valves 46, 48 are in selective fluid flow communication with the channel 44. The first valve 46 is adapted to selectively receive pressurized air from a pneumatic line 34 to provide pressurized air to the channel 44. The second valve 48 is adapted to selectively allow discharge of pressurized air from the channel 44.

A rubber seal 38 is provided in the back half of the mold and circumscribes the cavity and the channel, and is positioned between the front half and back half to prevent discharge of pressurized air from the cavity and from the channel as the cavity is being filled with molten plastic. Upon injection, the front half and back half of the mold have a tendency to separate slightly. The rubber seal 38 prevents leakage of pressurized air from the cavity when this separation occurs.

Figures 6, 7:
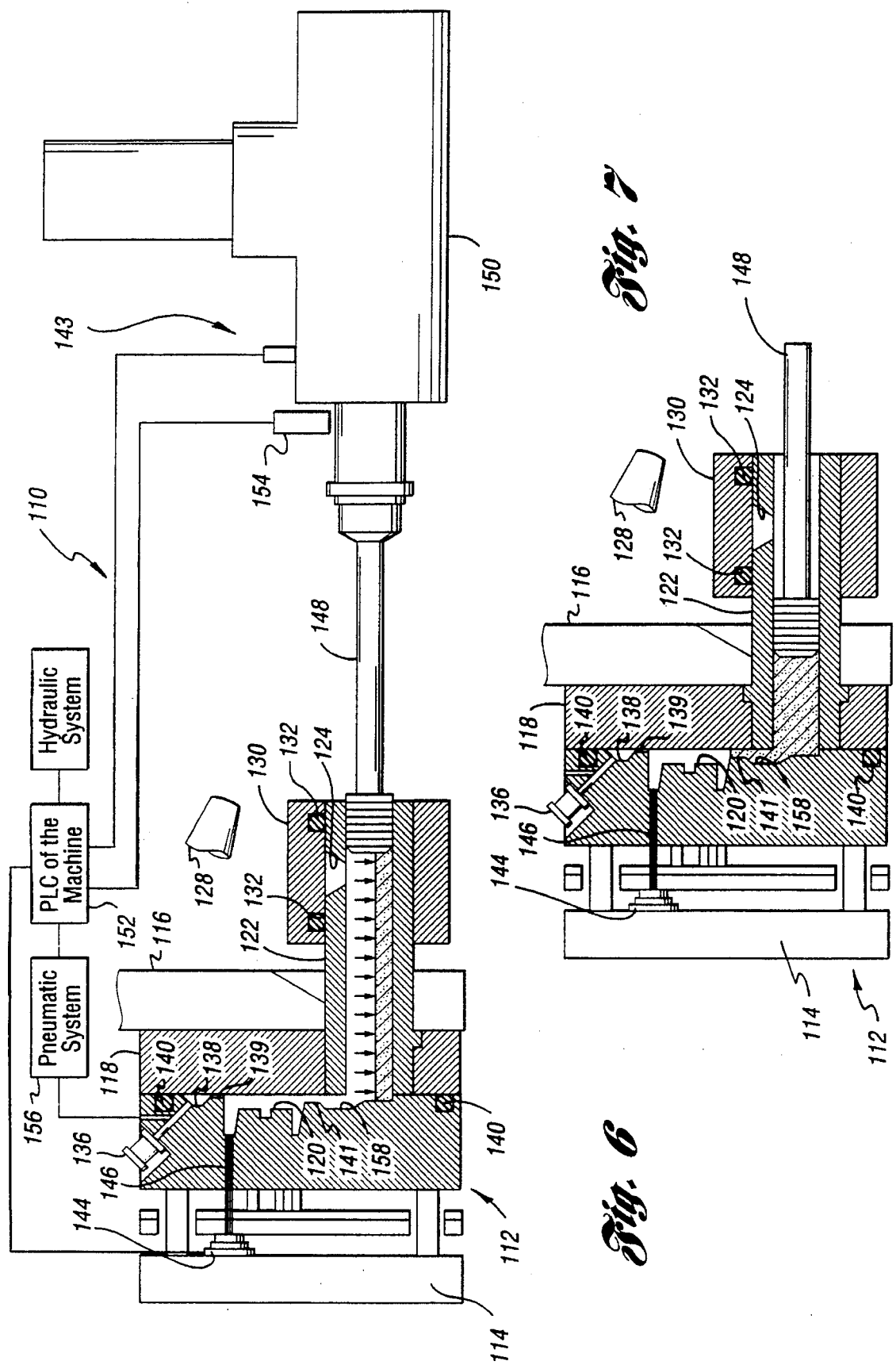
FIG. 6 is a schematic view of an aluminum casting unit for an aluminum casting apparatus having a mold and a pressure control system connected thereto in accordance with the present invention.
FIG. 7 is a vertical cross-section of an aluminum casting apparatus, including a mold, with the molten aluminum in a position just prior to entry in the mold cavity in accordance with the present invention.

A very similar counterpressure technology may be applied to the process of aluminum casting. Referring to FIG. 11, a comparison is illustrated between the injection pressure profile of the prior art in aluminum casting, and an air pressure and injection pressure profile in accordance with the present invention. FIG. 11 demonstrates a time versus pressure profile. Along the time axis, point A is the time at which the plunger of the aluminum casting apparatus begins to move forward (as illustrated in FIG. 6). Point B represents the period at which molten aluminum begins entry into the mold cavity (as illustrated in FIG. 7). Point C represents the point in time at which the mold cavity is substantially filled with molten aluminum (as illustrated in FIG. 8). The pressure line illustrations beyond point C illustrate the building of pack pressure to pack out the molten aluminum within the mold cavity.

More specifically, with reference to FIG. 11, line 100 illustrates the injection pressure in accordance with a prior art aluminum casting process. Between points A and B, while the plunger is moving along the sleeve, pressure acting upon the molten aluminum is extremely low. This low pressure arrangement provides ripe conditions for entrapment of gases, wave formation, and emergence of hydrogen gas from the melt which causes porosity in the melt. Between points B and C, the molten aluminum is injected into the cavity. Because the aluminum casting apparatus is unable to maintain a high pressure acting upon the aluminum during injection, conditions remain for formation and maintenance of gas porosity and void formation. At these low pressures, the solubility of hydrogen within the molten aluminum is very low, thus creating an environment for formation of porosity and voids and for the separation and emergence of hydrogen from the solidifying melt. These low melt pressure conditions in the cavity create tremendous problems within the final part as cast due to stresses, volumetric deficits and negative pressures created within the molten aluminum as it solidifies and develops porosity and voids, which adversely effect metallic bonding. A volumetric deficit is simply the volumetric difference between the liquid and solid state of a substance. Volumetric deficits can result from uneven cooling rates, and will create a vacuum-type void when inside the part, and will create a sink mark when formed outside the part. Stresses created from these volumetric deficits can lead to cracking of other structural problems. Furthermore, beyond point C, it takes a substantial period of time for the aluminum casting apparatus to build a sufficient pack pressure to pack out the aluminum within the mold cavity. This is mainly due to the fact that the aluminum casting apparatus is unable to maintain a high pressure acting upon the molten aluminum while the mold cavity is being filled. Accordingly, since the pack pressure starts out at a low point, it takes longer to build up the high pack pressure which is required.

However, according to the present invention, higher melt pressure conditions are created within the molten aluminum throughout the process in order to increase the solubility of hydrogen within the molten aluminum, decrease wave formation, decrease entrapment of gases and formation of porosity and voids, thus providing a part which is substantially stress relieved and free of gas porosity and voids. Accordingly, mechanical strength and structural integrity of the part is greatly enhanced.

Referring to FIG. 11, an air pressure 104 is established within the mold cavity and within the sleeve prior to injection. Between points A and B, the air pressure decreases the formation of waves which leads to reduced entrapment of gases, and increases the melt pressure of the molten aluminum which increases the solubility of hydrogen within the melt, thereby eliminating hydrogen void problems. The air pressure provides the capability of maintaining a higher melt pressure throughout the process. The large pressure surge after point B in the prior art in order to build the pack pressure causes turbulence within the molten aluminum and encourages "coasting" of waves back and forth within the molten aluminum in the mold cavity. These turbulent conditions cause problems within the molten aluminum as it solidifies. Between points B and C, during injection, the static melt pressure is maintained at a higher level than prior art systems, thereby creating a better casting environment and eliminating negative melt pressures during solidification at the time of filling of the cavity. Furthermore, beyond point C, the aluminum casting apparatus may raise the pressure up to a sufficient pack pressure level in a much shorter period of time than required by the prior art, thereby decreasing cycle time.

FIG. 9 is a graphical illustration of the injection pressure 102, shot speed 103 and cavity air pressure 104 versus time in accordance with the present invention, and corresponding with FIG. 11. As shown in FIGS. 9 and 11, the injection pressure build-up time is much quicker with the present invention (102) than with the prior art (100). FIG. 10 is a graphical illustration of the pressure difference between the air pressure in the cavity and the melt pressure versus time, in accordance with the cavity air pressure 104 development and injection pressure 102 development illustrated in FIG. 9.

A more detailed description of the present invention is provided with reference to FIG. 6. FIG. 6 illustrates a schematic view of an aluminum casting system 110 in accordance with the present invention. The aluminum casting apparatus 112 includes a pair of platens 116 with a mold 118 supported therebetween. A mold cavity 120 is formed within the mold 118 in the configuration of a part to be cast. Molten aluminum is poured into the sleeve 122 through the feed throat 124 from the spout 128.

Once molten aluminum has been poured into the sleeve 122 through the feed throat 124, a sealing collet 130 is placed over the feed throat 124. The collet 130 includes graphite seals 132 in order to provide an airtight environment for the sleeve 122. Air pressure is provided to the mold and the sleeve from a pneumatic system 156 through the air pressure valve and venting device 136. The pressurized air travels into the mold from the pneumatic system to the venting device 136, through the overshot well 138 and past the vents 139. Pressurized air travels through the mold cavity past the gate 141, and into the sleeve 122. The mold 118 is sealed airtight by the rubber/graphite seals 140. An ejector pin 144 is provided with a pressure transducer 146 therein to sense pressure in the mold cavity.

A plunger 148 is provided in communication with hydraulic injection unit 150 to provide sufficient injection pressure, in accordance with a predetermined pressure profile for the specific application, to the plunger 148 to move the molten aluminum from the sleeve 122 into the mold cavity 120. A controller 152 is provided in communication with a hydraulic pressure transducer 143. The hydraulic injection unit 150 monitors the hydraulic injection pressure through the transducer 143. A linear transducer 154 measures the speed and position of the plunger 148, and is in communication with the controller 152 to provide plunger speed information thereto. The controller 152 is also in communication with the cavity pressure transducer 144, which operates in cooperation with the ejector pin 146 for direct measurement of pressure in the cavity. The pneumatic system 156 provides pressurized air to the air pressure valve and venting device 136 and sends pressure information to the controller 152.

The controller 152 monitors the sensed pressure from the cavity pressure transducer 144, the linear transducer 154, and the hydraulic injection pressure from the hydraulic injection unit 150, as sensed by the hydraulic pressure transducer 143. The controller makes a calculation to determine the melt pressure of the molten aluminum throughout the process. A prescribed temperature profile, including a pressure difference between the melt pressure and air pressure is provided to the controller. The controller 152 controls the hydraulic injection pressure and the plunger speed in order to maintain the melt pressure at desired levels in accordance with the prescribed pressure difference profile.

The first step performed is to calculate a maximum stress for the mold cavity configuration, as described above with reference to the injection molding process. Next, an air pressure calculation for the sleeve is performed. A sample calculation for a linear gate is demonstrated with the following formula:

$$P = \frac{\rho \text{ (linear gate speed)}^2}{2g \text{ (discharge coefficient)}^2}$$

This calculation determines the amount of air pressure needed in order to eliminate the formation of waves in the molten aluminum in the sleeve as the plunger 148 moves at a certain speed. Different gate configurations would require different calculations. "Linear gate speed" is the speed at which the molten aluminum moves through the gate. Linear gate speed values can be readily obtained from charts provided by aluminum material suppliers, and are charted against pressure for the different types of aluminum. The "discharge coefficient" is a ratio of the pressure of the melt in the mold cavity and the pressure of the melt within the gate. The discharge coefficient is also available from charts provided by materials manufacturers. It is also commonly available from American Foundryman's Society publications. Additional background information on discharge coefficient and linear gate speed, and how to calculate for different gate configurations may be found in "PRESSURE DIECASTING Part 2, The Technology of the Casting and the Die", D. F. Allsop, copyright 1983, and "Cating Die Casting Dies", Van Kens, NADCA, EC-514. These publications are available in libraries and through the North American Die Casting Association.

An air pressure is then established in the sleeve 122 which is equal to the larger number of the maximum calculated stress or the calculated air pressure needed to eliminate wave formation. Of course, the air pressure in the sleeve could be set at a greater level. In fact, as the plunger moves, the air will be compressed, which will increase the air pressure.

Referring back to FIG. 11, no closed loop control is required between points A and B because the system is in transition from static to dynamic. When the system reaches point B, static pressure control is required, and a pressure difference is established between the air pressure and the melt pressure, the pressure difference being equal to the maximum stress calculated to occur during injection and solidification of the part as it is constrained within the mold cavity.

Still referring to FIG. 11, the injection pressure 102 is slightly higher than the air pressure 104 in the sleeve when the plunger 148 begins moving because the density of the aluminum is higher than the density of the air in the sleeve, so the molten aluminum accepts more momentum and develops a higher pressure.

When the system reaches point B, as displayed in FIG. 7, the molten aluminum has reached the gate 141. The dynamic melt pressure of the molten aluminum is then calculated in accordance with the following formula:

$$P_{dyn} = \frac{\rho \text{ (gate velocity)}^2}{2g \, (cd)^2}$$

where cd is the discharge coefficient at the gate. The gate velocity is a function of the flow rate and the area of the gate. The flow rate is provided by the hydraulic injection unit, and is a function of the hydraulic injection pressure and the injection speed.

The controller 152 makes this calculation approximately every 2 milliseconds and adjusts the hydraulic injection pressure or the plunger speed in order to maintain a desired pressure difference between the dynamic melt pressure and the air pressure in the cavity as the molten aluminum is injected into the cavity.

The maintenance of a pressure difference between the dynamic melt pressure and the air pressure in the cavity maintains a static pressure within the molten aluminum as it is injected into the mold cavity. This static pressure provides venting power to the melt. This venting power allows the melt to vent, fill, and pack out any ribs or bosses which exist lateral to the flow direction of the molten metal. Accordingly, the molten metal fully packs out the mold cavity as it moves through the cavity. The static pressure created by the pressure difference also prevents trapping of gases from mold release spray and trapping of moisture from mold release spray. In addition, the static pressure maintains a high level of solubility of hydrogen within the molten aluminum, thereby preventing the formation of hydrogen voids and gas porosity within the aluminum.

"Static pressure" is the pressure of the melt acting in all directions, while the "dynamic pressure" is the pressure of the melt in the flow direction. For example, with the present invention, if the dynamic melt pressure is equal to the air pressure in the cavity, then the melt will not flow into the cavity. However, if the air pressure is less than the dynamic melt pressure, then the melt will move into the cavity, and the result of the air pressure pushing against the oncoming melt front is to create a "static" pressure in the melt which acts in all directions, including laterally to the flow direction. The air pressure in the cavity acts to compress the melt as it flows into the molt cavity, which creates a general internal static pressure in the molten material, as the material wants to expand against this air pressure resistance. This static melt pressure provides pressures or forces acting laterally to the flow direction which helps to force the molten material against the walls of the mold cavity in order to "pack out" the material from inside so that it is fully pressed against the walls of the cavity. The static pressure also gives the molten material "venting power" which is the ability of the molten material to enter into lateral indentations (or ribs) in the mold cavity and push any air or other gases out of that indentation (i.e., "vent out" the area) so that the molten material can fully fill the indentation (or rib) and "pack out" that area with molten material as the molten material flows past the indentation as a result of its dynamic pressure. The static pressure also counteracts volumetric shrinkage forces for prevention of sink marks or internal voids.

There are numerous advantages provided by the present invention. The possibility for a choice of proper composition and pressure of the gas above the melt in the sleeve is provided. This makes possible the dissolving or elimination of trapped gases and maintenance of dissolved gases on the basis of the law of mass exchange (m=c×P). For example, a simple two component system is the solution of a gas dissolved in a liquid. There are two phases, the solution and the gas above it. Then, by the phase rule, two variables must be given to describe the equilibrium between the phases; these variables are temperature and pressure. When temperature is held constant, the effective pressure in determining the mass of gas dissolved is given by Henry's Law: Mass=Constant×Pressure. If the two components react, more gas will dissolve. Additional background information regarding Henry's Law may be found in Grolier's Encyclopedia in Grolier's Electronic Publishing, 1992. The amount of hydrogen dissolved in the melt is a direct function of the pressure applied on the melt. The formation of waves in the sleeve and cavity causes a wide range of pressures which increase and decrease the solubility of hydrogen in the melt. Ideally, it is desirable to dissolve as much hydrogen as possible within the melt. Undissolved hydrogen will incorporate in voids, cause porosity, and decrease structural integrity by interfering with metallic bonding.

At a high partial pressure of gas within the sleeve, hydrogen solubility increases. The flattening of wave formation decreases the possibilities for entrapment of gases or air within the molten aluminum. The air pressure in the sleeve decreases movement and further incorporation of existing hydrogen within the molten aluminum. The air pressure also helps to develop a desirable static pressure within the melt.

High partial gas pressures within the mold cavity maintain high hydrogen solubility within the molten aluminum and hydrogen separation from the solidifying melt is decreased, as well as the formation of gas porosity and voids. Any inert gas, such as air, hydrogen or argon may be used in the mold cavity. Protective gases can be used for metals with a higher level of affinity to form oxides.

The air pressure acting against the front of the rising metal through the feeder heads provides improved "feeding" of the casting during the solidification. "Feeding" is a term used to describe the process by which the crystal structure of the solidifying aluminum is "fed" with molten aluminum at the right place, at the right time and at the right pressure in order to avoid the formation of voids and to improve metallic bonding during solidification. The air pressure provides the possibility to establish and maintain a constant pressure difference between the melt pressure and air pressure, which improves feeding. This pressure difference is controllable by the machine controller 152.

The grain uniformity and mechanical properties of thick walls of the casting will be identical with those of thin walls using this process. In areas of abrupt changes between thin and thick walls, no unsound structure is obtained. The casting has higher configuration stability and strength because, ideally, there are no spots with substantial crystalline differences or voids from the incorporation of unwanted gases. The static pressure of the molten aluminum improves the infiltration of the melt between the crystals which form from the cavity surface inward, which decreases or eliminates conditions under which axial porosity occurs.

When the solidifying crystals are in contact but still include some liquid metal, the entire structure is mobile and subject to deformation. Accordingly, providing static pressure in the melt to these solidifying crystals, which include liquid metal, even at low pressures, leads to micro plastic deformation and to the elimination of conditions which lead to natural porosity.

This type of closed loop control of the injection from a created pressure difference provides precise control of the filling rate of the mold cavity. This method can also reduce the size of the riser 158, thus increasing yield. Furthermore, the improved pressure balance reduces core and mold deformation and breakage, thus improving the life of the mold. It also improves the effectiveness of overshot wells (feeder heads), or else reduces the need for the overshot wells. In addition, the laminarity of the flow is increased, and "coasting" of waves back and forth within the cavity decreases, which results in less turbulent solidification conditions.

A major advantage of this invention is that the maintenance of the pressure difference between the melt pressure and the air pressure eliminates the "way resistance" or mold resistance effects of varying part configurations and gate configurations. This greatly increases the technological possibilities for resolving casting problems in critical sections of the casting. For example, if a pressure drop is created by a thick walled section of a mold cavity, the air pressure and melt pressure may be maintained at higher levels in order to reduce or completely eliminate the pressure drop effects of the thick section. Furthermore, the present invention maintains a higher melt pressure throughout the process. Accordingly, a high pressure is maintained while the temperature is still high in the molten aluminum, which provides better infiltration and better settling conditions within the solidifying crystals, in comparison to the prior art.

The injection power curve shown in FIG. 12 further illustrates the advantages of the present invention. Using prior art systems, the injection pressure or melt pressure and flow rate are limited by the power curve line 170. At point $X_1$, the mold cavity is full and maximum injection pressure is received from the machine. At $X_2$, there is no mold resistance, and maximum flow rate is achieved. A line connecting these two points defines the limit of power available in this system. For example, if we calculate the dynamic melt pressure P to be $P_1$, the flow rate is limited to $Q_1$ in accordance with the prior art systems. However, this flow rate may be too low to support the feeding of solidifying crystals during filling of the mold because cooling occurs too quickly. Therefore, in accordance with the present invention, if we add an air pressure to the other side of the melt, the power curve line 170 is no longer limiting and the mold cavity can be effectively fed at a high flow rate using a high pressure. Effectively, the static pressure created gives the possibility to exceed the maximum machine power curve in accordance with the prior art and to achieve pressures and flow rates within the cross-hatched area of FIG. 12.

Accordingly, the present invention gives the possibility to operate an aluminum casting apparatus at a high injection pressure, a high flow rate, and it facilitates the use of larger gate sizes.

Of course, this invention is also applicable to aluminum casting machines employing a vertical sleeve or vertical injection unit with horizontal die clamping.

While the best modes for practicing the invention have been described in detail, those familiar with the art to which this invention relates will recognize various alternative designs and embodiments for practicing the invention as defined by the following claims.

What is claimed is:

1. A method of injecting molten metal from a melt holder into a mold cavity defined within a mold in a metal casting apparatus, comprising:

supplying pressurized gas to the mold cavity and melt holder to pressurize gas in the cavity and molten metal in the melt holder prior to injection;

generating a melt pressure in the molten metal sufficient to inject the molten metal into the cavity after the gas in the cavity is pressurized;

monitoring the melt pressure and the pressure of gas in the cavity as the melt moves from the melt holder into the mold cavity; and providing a closed loop controller to maintain a predetermined controllable pressure difference between the melt pressure and the pressure of gas in the cavity throughout a substantial portion of a period of time during which molten metal is being injected into the cavity to fill the cavity.

2. The method of claim 1, wherein the maintenance of said predetermined pressure difference includes the steps of:

calculating a maximum stress to be experienced by the solidified metal in the metal casting apparatus; and maintaining said melt pressure substantially equal to said calculated maximum stress during a substantial portion of a period of time during which the molten metal is injected into the cavity to fill the cavity.

3. A method of improving venting power of molten metal as it is injected from a melt holder into a mold cavity formed within a mold in a metal casting apparatus, the cavity including small indentations formed therein which exist lateral to the flow direction of the molten metal, the mold including vents formed in communication with the cavity, the molten metal having a dynamic pressure as it moves into the mold cavity and the venting power being the molten metal's ability to force any existing cavity air or other gases through the vents of the mold cavity sufficiently to allow the metal to pack out against the walls of the mold cavity, the method comprising:

providing pressurized gas to the mold cavity prior to injection; and maintaining a pressure difference between the dynamic melt pressure and the pressure of gas in the cavity to create a static pressure in the molten metal, whereby to improve the venting power of the molten metal to allow said molten metal to vent, fill and pack out any said indentations as the molten metal moves throughout the cavity.

4. A method of injecting molten metal from a melt holder into a mold cavity defined within a mold in a metal casting apparatus having a movable plunger for injection, and wherein the molten metal experiences pressure transitions in response to plunger movement and varying resistance to flow as the molten metal is injected into the cavity, comprising:

supplying pressurized gas to the mold cavity and to the melt holder prior to injection to pressurize gas in the cavity and molten metal in the melt holder sufficiently to provide a preloaded static system in which the gas in the mold cavity is pre-pressurized and molten metal in the melt holder is pre-pressurized with static pressure prior to injection;

generating a melt pressure in the molten metal sufficient to inject the molten metal into the cavity after the gas in the cavity is pressurized;

monitoring the melt pressure and the pressure of gas in the cavity as the melt moves from the melt holder into the mold cavity; and providing closed loop pressure control for maintaining pressure differences between the monitored melt pressure and the monitored pressure of gas in the cavity in accordance with a preprogrammed pressure profile for injecting the molten metal into said cavity, whereby to maintain the static pressure in the molten metal during injection.

5. A method of injecting molten metal from a melt holder into a mold cavity defined within a mold in a metal casting apparatus, comprising:

supplying pressurized gas to the mold cavity and to the melt holder prior to injection to pre-pressurize the cavity and the molten metal sufficiently to provide a preloaded static system in which the gas and the molten metal are both pre-pressurized prior to injection;

generating a melt pressure in the molten metal sufficient to inject the molten metal into the cavity against the pressurized gas in the cavity; and maintaining the melt pressure and the pressure of gas in the cavity at desired levels during injection.

* * * * *

UNITED STATES PATENT AND TRADEMARK OFFICE
CERTIFICATE OF CORRECTION

PATENT NO. : 5,566,743
DATED : October 22, 1996
INVENTOR(S) : Milko G. Guergov

It is certified that error appears in the above-indentified patent and that said Letters Patent is hereby corrected as shown below:

Column 4, line 45, delete "0.24241," and replace with --0.24241*-- therefor.

Column 13, line 5, delete "A=0.24241W*√T1" and replace with --A=0.24241*W*√T1--.

Column 13, line 7, delete "c" and replace with --C-- therefor.

Column 15, line 33, delete "of" and replace with --or-- therefor.

Signed and Sealed this

Twenty-eighth Day of October, 1997

Attest:

BRUCE LEHMAN

Attesting Officer

Commissioner of Patents and Trademarks